US012495277B2

(12) United States Patent
Nickisch et al.

(10) Patent No.: US 12,495,277 B2
(45) Date of Patent: Dec. 9, 2025

(54) UNIFIED OPERATION FOR USER EQUIPMENT GROUPS

(71) Applicant: Apple Inc., Cupertino, CA (US)

(72) Inventors: Dirk Nickisch, Oberpframmern (DE); Sharad Sambhwani, San Diego, CA (US); Dhiraj J Shirke, San Jose, CA (US); Madhukar K Shanbhag, Santa Clara, CA (US); Parvathanathan Subrahmanya, Sunnyvale, CA (US); Pranav Tripathi, San Jose, CA (US); Rohit U Nabar, Sunnyvale, CA (US); Sanjeevi Balasubramanian, San Jose, CA (US); Shiva Krishna Narra, San Jose, CA (US); Sriram Subramanian, Santa Clara, CA (US); Tarik Tabet, San Diego, CA (US); Vishwanth Kamala Govindaraju, Mountain View, CA (US); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 17/941,519

(22) Filed: Sep. 9, 2022

(65) Prior Publication Data

US 2023/0145333 A1 May 11, 2023

Related U.S. Application Data

(60) Provisional application No. 63/278,438, filed on Nov. 11, 2021.

(51) Int. Cl.
*H04W 4/08* (2009.01)
*H04L 5/00* (2006.01)
(Continued)

(52) U.S. Cl.
CPC ............. *H04W 4/08* (2013.01); *H04L 5/0048* (2013.01); *H04L 5/0051* (2013.01);
(Continued)

(58) Field of Classification Search
CPC ........................................................ H04W 4/08
See application file for complete search history.

(56) References Cited

U.S. PATENT DOCUMENTS 10,477,421 B2 11/2019 Bienas
2015/0282234 A1* 10/2015 Sartori ............. H04W 28/0278 370/329
(Continued)

FOREIGN PATENT DOCUMENTS

CN 113424460 A 9/2021
WO 2017105534 A1 6/2017
WO 2018202797 A1 11/2018

*Primary Examiner* — Jason E Mattis
(74) *Attorney, Agent, or Firm* — FLETCHER YODER PC

(57) ABSTRACT

User equipment in close proximity may transfer data and control information. For example, the user equipment may exchange data or data sets between each other. Each user equipment can receive and transmit data using radio access technologies. A group of user equipments may include active user equipment and passive user equipment. Active user equipment connects with one or more base stations and transfers data on a wireless communication network via the base station. The active user equipment may communicate with other active user equipment and passive user equipment. Passive user equipment may not connect to any base station and/or the wireless communication network and may communicate with other passive user equipment and active user equipment (e.g., via a sidelink, peer-to-peer, or device-to-device channel).

20 Claims, 12 Drawing Sheets

(51) Int. Cl.

| | |
|---|---|
| ***H04W 48/12*** | (2009.01) |
| ***H04W 48/16*** | (2009.01) |
| ***H04W 56/00*** | (2009.01) |
| ***H04W 68/00*** | (2009.01) |
| ***H04W 72/30*** | (2023.01) |
| ***H04W 76/10*** | (2018.01) |
| ***H04W 76/14*** | (2018.01) |
| ***H04W 76/15*** | (2018.01) |
| ***H04W 76/19*** | (2018.01) |
| ***H04W 76/30*** | (2018.01) |
| ***H04W 76/40*** | (2018.01) |
| *H04W 80/04* | (2009.01) |

(52) U.S. Cl.

CPC ........... *H04W 48/12* (2013.01); *H04W 48/16* (2013.01); *H04W 56/001* (2013.01); *H04W 68/005* (2013.01); *H04W 72/30* (2023.01); *H04W 76/10* (2018.02); *H04W 76/14* (2018.02); *H04W 76/15* (2018.02); *H04W 76/19* (2018.02); *H04W 76/30* (2018.02); *H04W 76/40* (2018.02); *H04W 80/04* (2013.01)

(56) References Cited

U.S. PATENT DOCUMENTS

| | | | | |
|---|---|---|---|---|
| 2017/0105128 | A1* | 4/2017 | Chiba | H04W 48/02 |
| 2020/0053835 | A1* | 2/2020 | Ye | H04L 1/08 |
| 2020/0092685 | A1 | 3/2020 | Fehrenbach | |
| 2022/0007153 | A1 | 1/2022 | Scott | |
| 2022/0201503 | A1 | 6/2022 | Wang et al. | |
| 2022/0386081 | A1* | 12/2022 | Chen | H04W 4/40 |
| 2023/0143225 | A1 | 5/2023 | Sambhwani | |

* cited by examiner

UNIFIED OPERATION FOR USER EQUIPMENT GROUPS

CROSS-REFERENCE TO RELATED APPLICATIONS

This application claims priority to U.S. Provisional Application No. 63/278,438, filed Nov. 11, 2021, entitled "COOPERATIVE COORDINATION SCHEMES FOR MULTI-NODE DEVICES," the disclosure of which is hereby incorporated by reference in its entirety for all purposes.

BACKGROUND

The present disclosure relates generally to wireless communication, and more specifically to cooperative communication for user equipment in a group of user equipment.

User equipment density has increased rapidly over the years. User equipment may also support several radio access technologies (RATs) simultaneously in close proximity to one another. Moreover, with the use of high spectrum frequencies (e.g., the millimeter wave (mmW) frequency range, the terahertz (THz) frequency range), the coverage range of wireless communication networks may be limited in terms of signal loss. Additionally, communication between each user equipment and a wireless communication network may be performed through point-to-point connections without cooperation of nearby user equipment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an electronic device includes a transmitter, a receiver, and a processor coupled to the transmitter and the receiver. The processor receives a configuration message from a base station associated with a wireless communication network and transmits the configuration message to a second user equipment of a group of user equipment, the second user equipment being disconnected from the base station and configured to perform configuration based on the configuration message.

In another embodiment, a method includes receiving, at a receiver of a first user equipment, a set of device identifiers associated with a group of user equipment, transmitting, by a transmitter of the first user equipment, the set of device identifiers to a base station of a wireless communication network, receiving, at the receiver, a group identifier associated with the group of user equipment from the base station.

In yet another embodiment, one or more non-transitory, tangible, computer-readable media that store instructions that cause a processor to receive, at a base station associated with a wireless communication network, a set of device identifiers associated with a group of user equipment, generate, at the base station, a group identifier based on the set of device identifiers, transmit the group identifier to a first user equipment of the group of user equipment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
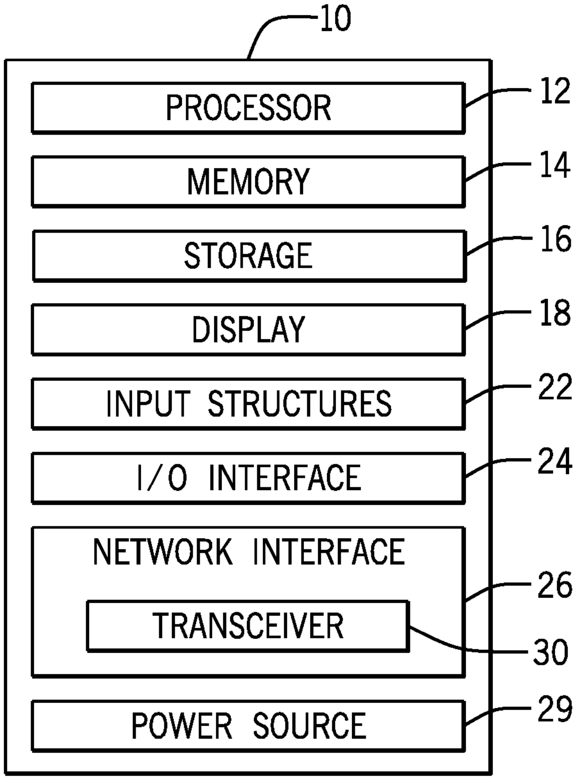
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members. Furthermore, as used herein, a set may include a portion (e.g., a subset, all) of data and/or information. While the data is described herein as including two data sets or three data sets, this is intended to be illustrative of certain embodiments. As such, the data may include any suitable number of data sets (e.g., two data sets, three data sets, four data sets, eight data sets, and so forth). Additionally, as used herein, a first set of user equipment may include the same user equipment as another set of user equipment, different user equipment than another set of user equipment, additional user equipment than another set of user equipment, fewer user equipment than another set of user equipment, and so forth.

The present disclosure relates generally to wireless communication, and more specifically to cooperative communication for user equipment in a group of user equipment. Wireless device density has increased rapidly over the years. Wireless communication between user equipment (UE) and wireless communication networks may occur directly through a point-to-point connection without regards to nearby user equipment. Wireless UE may also support several radio access technologies (RATs) simultaneously in close proximity to one another. Moreover, with the use of high spectrum frequencies (mmW, THz), the range of communication may be limited due to signal dissipation. Employing local communications (e.g., device-to-device communications, sidelink, peer-to-peer) may facilitate and improve the range, coverage, reliability and efficiency of communications between user equipment and wireless communication networks. This disclosure relates to systems, apparatuses, and techniques to enable user equipment to cooperate with adjacent user equipment to improve coverage and capacity.

User equipment may establish groups to facilitate and coordinate communication with wireless communication networks. Cooperative communication between user equipment may be beneficial for offloading data and controlling transmissions to one or more designated user equipment within a group of user equipment. Data sharing (e.g., via a device-to-device communication link) may also reduce power consumption for user equipment in the group when compared to directly (e.g., without an intervening or intermediate device) communicating with a network. Embodiments herein provide various systems, apparatuses, and techniques to provide cooperative communication for a group of user equipment. In particular, a communication network (e.g., a $5^{th}$ generation (5G)/New Radio (NR) network, a $4^{th}$ generation (4G)/long term evolution (LTE®) network, a $6^{th}$ generation (6G) or greater than 6G network, and so on), via a base station, may communicate with the group of user equipment via one or more active user equipment (e.g., user equipment connected to or directly connected to the communication network). The active user equipment may communicate with passive user equipment (e.g., user equipment disconnected from the communication network). In particular, the user equipment in the group may communicate using a personal area network (PAN), a local area network (LAN) or wireless local area network (WLAN), and/or a wide area network (WAN).

User equipment in close proximity with one another may transfer data and control information. For example, the user equipment may exchange data or data sets between each other. Each user equipment can receive and transmit data using RATs. The user equipment may transmit and receive data from a wireless communication network via any number of base stations. A group of user equipment may include active user equipment and passive user equipment. An active user equipment connects with one or more base stations and transfers data on a wireless communication network via the base station. That is, the active user equipment may be directly connected with one or more base stations. Additionally, the active user equipment may communicate with other active user equipment and passive user equipment. Passive user equipment may not connect to any base station and/or the wireless communication network and may communicate with other passive user equipment and active user equipment (e.g., via a sidelink, peer-to-peer, or device-to-device channel). That is, the passive user equipment may communicate indirectly with the base station and/or the wireless communication network via an active user device.

One or more of the active user equipment may be designated as a primary user equipment. The primary user equipment may control the group membership, define configuration for a device-to-device communication link, and may add or release user equipment from the group. In particular, primary user equipment may control roles for other user equipment in a local network. For example, a first user equipment, such as a portable electronic device may control and communicate with secondary user equipment, such as a television, a tablet, a computer, and so forth. In some instances, one or more active user equipment and one or more passive user equipment may act as relay user equipment. A relay user equipment may act as an intermediary device and may transfer data from one user equipment to another user equipment in the group. Additionally, the relay user equipment may facilitate communication with the wireless communication network by transferring (e.g., tunneling) data from the base station to other user equipment in the group.

The base stations of the wireless communication network may facilitate communication and provide access for active user equipment to receive and transfer data to and from an application server and/or a communication network. In certain instances, the base stations may be operated and/or controlled by separate carriers or operators. Additionally, the base stations may operate using the same or different communication technologies, such as one or more RATs and/or local networks.

One or more active user equipment may receive data or a data set. The active user equipment may transmit the data or the sets of data to other active user equipment and passive user equipment in the group. That is, the active user equipment may receive the data and/or the data sets and may cooperate and coordinate to facilitate communication of the data from a base station to other user equipment. In certain instances, each active user equipment may connect to one or more base stations. Moreover, the active user equipment may receive the same and/or different data or data sets from different base stations. Additionally, the different base stations may communicate with the active user equipment using the same or different communication technologies. The passive user equipment may receive the data or the data sets from other passive user equipment and/or the active user equipment. As such, a set of the user equipment (e.g., any number of active user equipment, any number of passive user equipment, or any combination thereof) may receive the data sets either directly (e.g., from the base station) and/or indirectly (e.g., from one or more active user equipment, from one or more passive user equipment, or any combination thereof) from the wireless communication network. The user equipment in the group may assemble the data based on the data sets.

In certain instances, the application server may split data into one or more data sets and may transfer the one or more sets to one or more base stations. The active user equipment may receive the sets from the base stations. For example, a first active user equipment may receive a first set from the first access point and a second active user equipment may receive a second set from the second base station. The active user equipment may exchange the data sets between each other and each active user equipment may reassemble the sets to form the data. Additionally or alternatively, the base stations may split data into data sets and/or may split data sets into data subsets.

In some instances, a first set of the active user equipment may utilize a second set of the active user equipment to receive and transfer one or more data sets. In particular, the active user equipment may cooperate and coordinate to transmit the same data and/or the same data sets. Additionally or alternatively, the first set of the active user equipment may not transmit its received data set. The first set of the active user equipment may receive one or more data sets from the second set of the active user equipment. Accordingly, only the first set of the active user equipment may receive all data sets and may reassemble the data. Additionally, the active user equipment may transmit one or more data sets to one or more passive user equipment. Alternatively, the active user equipment may transmit the data to one or more passive user equipment. In some instances, a first passive user equipment may transmit one or more data sets or the data to a second passive user equipment. Additionally, the active user equipment may cooperate to transmit the same data set to one or more base stations simultaneously, concurrently, consecutively, overlapping, separately, and so forth. Moreover, a passive user equipment may transmit the same data set to several active user equipment for transmission to the base stations. In certain instances, the passive user equipment may transmit the same data set sequentially or broadcast concurrently to several active user equipment.

In order to transfer data and/or data sets consistently and efficiently, the base stations and/or the active user equipment may split the data into data sets and may transfer the data sets to user equipment within the group. The user equipment may then transfer the data and/or the data sets to other user equipment in the group using local networks and local connections. Once received, the user equipment may assemble the data sets. Data transfer, data splitting, and/or data assembly may be implemented in different layers of various communication protocols.

Additionally, the data may be steered to particular or target active user equipment. For example, the application server may determine a first data set to transmit to a first active user equipment, a second data set to transmit to a second active user equipment, and so forth. Additionally or alternatively, a first base station may determine a third data set to transmit to a second base station based on a connection status between the second base station and the application server.

In certain embodiments, the application server and/or the base stations may generate and/or provide routing information associated with the data. The routing information may include a path (e.g., sequence of user equipment that receive the data, ordering of user equipment that receive the data, and so forth). For example, the base station may generate and/or receive the routing information based on information associated with the group of user equipment. The information may include a list of device-to-device communication links (e.g., current communication links, historical communication links, available communication links, and so forth) between the user equipment. The base station may generate and/or receive a path for transmission of the data to the target user equipment. The base station may first transmit the routing information to one or more active user equipment communicatively coupled to the base station. The routing information may specify one or more active user equipment to receive the data and/or the routing information from the base station. In certain embodiments, the routing information may specify one or more passive user equipment to receive the data and/or the routing information from the one or more active user equipment. Additionally or alternatively, the routing information may specify one or more active user equipment and/or one or more passive user equipment to transmit the data and/or the routing information to the target user equipment. As such, the routing information may specify a path or routing for the data and/or the routing information to take from the application server to the base stations to the user equipment (e.g., active user equipment, passive user equipment, target user equipment).

In some embodiments, the routing information may specify a first set of active user equipment to transmit the data and/or the routing information to from a first base station. Additionally or alternatively, the routing information may specify a second set of active user equipment to transmit the data and/or the routing information to from a second base station. As such, the routing information may include a path or routing for the data and/or the routing information from the application server to one or more active user equipment within the group of user equipment via the base stations. In certain embodiments, the routing information may specify a first set of passive user equipment to transmit the data and/or the routing information to from the first set of active user equipment. Additionally or alternatively, the routing information may specify a second set of passive user equipment to transmit the data and/or the routing information to from the second set of active user equipment. The routing information may also specify active user equipment transmit the data and/or the routing information to other active user equipment. The routing information may also specify passive user equipment transmit the data and/or the routing information to other passive user equipment. The routing information may also specify the target user equipment to receive the data and/or the routing information. While the above describes paths or routing for data from an application server to target user equipment, routing information may also be used to specify a path or routing for data from any user equipment to the application server via active user equipment, passive user equipment, base stations, and so forth. Additionally or alternatively, the routing information may be transmitted (e.g., by the base stations, by the user equipment) concurrently with the data, subsequently to transmission of the data, prior to transmission of the data, or any other suitable timing.

Active user equipment may be controlled using control channels based on the direct connection to the base station. Passive user equipment may have an indirect connection and may be accessible via an updated control channel path. Control channels provide configuration data to user equipment for paging the user equipment and scheduling data reception and transmission. Active user equipment may identify that a paging message, a configuration message, and/or control data is intended for passive user equipment. The active user equipment may perform the identification based on an identifier associated with a protocol layer format.

A Radio Resource Control (RRC) message may provide configuration data to user equipment. The base station may transmit the RRC message to an active user equipment that in turn transmits the message to a passive user equipment. Responses may be transmitted to the base station via the active user equipment (e.g., in some cases, from passive user equipment). Downlink Control Information (DCI) and Uplink Control Information (UCI) may be utilized to control physical layer operation.

Moreover, the user equipment may utilize various criteria for entering and/or leaving a group of user equipment. The criteria may include a network signal quality of the user equipment, a power connection, a battery level of the user equipment, a time window, a geographic area of the user equipment, user equipment capabilities (e.g., communication capabilities, computing and/or processing capabilities, sensing capabilities, and so forth), a device-to-device connection, a trust level between user equipment, and so forth. The network signal quality of the user equipment may be compared to a threshold. When below the threshold, there may be a risk that service is interrupted. If another user equipment or a group of user equipment are in close proximity, the user equipment may attempt to form a group or enter the previously formed group. If a user equipment is connected to an electrical grid (e.g., such that it is not powered via its battery), it may no longer require the benefits of shared resources within a group and may leave the group. Alternatively, when connected to electrical grid, the user equipment may receive additional tasks within the group. Additionally, the criteria may be selected based on user preferences and/or user equipment history.

Formation of the group of user equipment may begin with user equipment discovery. The user equipment may receive an input to begin user equipment discovery. Additionally or alternatively, the user equipment may begin discovery based on satisfaction of any number of discovery criteria. For example, the discovery criteria may include a power connection, a battery level of the user equipment, a signal strength (e.g., Received Signal Strength Indicator, signal to noise ratio (SNR), or other signal characteristics) associated with the wireless communication network, a time window, a geographic area of the user equipment, and so forth. User equipment may discover other nearby user equipment using wired communications, such as power-line communication (PLC), such as a broadband over power lines (BPL) communication, and/or wireless communications, such as personal area network (PAN), such as an ultra-wideband (UWB) or a BLUETOOTH® network, a local area network (LAN) or wireless local area network (WLAN), and/or a wide area network (WAN). User equipment may be permitted to search for and join a group of user equipment during a particular time window. Additionally, the user equipment may search for and enter a group of user equipment when within a particular geographic area or in proximity or range of a set of user equipment, such as a home or an office. Alternatively, the user equipment may leave a group when leaving the particular geographic area or the proximity or range of the set of user equipment. User equipment that lacks radio technology or does not support particular frequencies may search for and enter a group of user equipment with different and/or greater user equipment capabilities. Additionally, the user equipment may determine whether the user equipment capabilities permit the user equipment to communicate with other user equipment in the group. The user equipment may determine whether a stable device-to-device connection is available with one or more user equipment in the group based on the Received Signal Strength Indicator (RSSI) and signal to noise ratio (SNR), or other signal characteristics. User equipment trust may be established based on previously entering the group of user equipment.

Entering a group of user equipment may begin with group discovery. One or more user equipment within the group may transmit reference signals on a local communications frequency. The reference signals may include specialized wake-up signals that reduce power consumption. Additionally or alternatively, the reference signals may include a first reference signal that includes a specialized wake-up signal and a second reference signal that includes additional information. The user equipment may transmit the second reference signal based on an acknowledgement from another user equipment of the first reference signal. The user equipment may select one or more reference signals based on various transmission criteria. For example, the transmission criteria may include a power connection, a battery level of the user equipment, a time window, a geographic area of the user equipment, user equipment capabilities (e.g., communication capabilities, computing and/or processing capabilities, sensing capabilities, and so forth), and so forth.

User equipment outside the group may periodically search for and attempt to detect the reference signals. Additionally or alternatively, any number of user equipment may receive a synchronization signal from one or more base stations via the wireless communication network. The user equipment may receive the synchronization signal and may scan for reference signals and/or transmit reference signals. The user equipment may measure the reference signals and join the group. The next step of entering the group includes establishing device-to-device connections. The device-to-device connection may be direct or through a local network connection. The user equipment may also exchange user equipment capabilities. The user equipment capabilities may be utilized to determine preferred communication frequencies, the types of communication technologies of the group and the new user equipment, a current battery status of the user equipment, a current thermal status of the user equipment, and so forth. Each user equipment may periodically send a keep alive message to at least one primary user equipment and/or active user equipment in the group. Additionally, the user equipment may send an exit message to at least one primary user equipment and/or active user equipment in the group. For example, the user equipment may send the exit message based on failing to satisfy any number of group criteria, such as a signal strength associated with a device-to-device connection to at least one primary user equipment and/or active user equipment.

To maintain the group, the number of active user equipment and/or the number of passive user equipment may be controlled (e.g., by the primary user equipment). For example, if an active user equipment leaves coverage of a base station, the active user equipment may be reassigned as a passive user equipment. A primary user equipment may fall below a battery threshold and a new primary user equipment may be assigned. The primary user equipment may receive regular updates from other user equipment in the group regarding battery status, thermal status, and link status of the user equipment. Additionally, the primary user equipment may maintain a list of candidates from the active user equipment to be assigned as a new primary user equipment. The primary user equipment may send a request to one of the candidates to become a new primary user equipment. Additionally, the primary user equipment may determine elapsed times from receiving keep alive messages and/or from receiving data from any of the user equipment within the group. The primary user equipment may compare the elapsed times to a threshold time duration and may transmit an exit message based on one or more of the elapsed times exceeding the threshold time duration. The primary user equipment may remove a device identifier associated with the user equipment based on the elapsed time. Additionally, the user equipment may determine elapsed times from receiving keep alive messages and/or from receiving data from at least one primary user equipment and/or active user equipment. The user equipment may compare the elapsed times to a second threshold time duration and may transmit an exit message based on one or more of the elapsed times.

The primary user equipment notifies the wireless communication network of the group establishment including a list of the user equipment in the group. The notification may also include device specific identifiers. The wireless communication network may assign a group identifier, such as a Group Radio Network Temporary Identifier (G-RNTI), to the group of user equipment and may transmit the G-RNTI to the primary user equipment. Accordingly, the wireless communication network and/or the primary user equipment may utilize the G-RNTI to identify the group for control signaling. To add or remove a secondary user equipment, the primary user equipment may report the G-RNTI and the corresponding device specific identifier for the secondary user equipment to the network. Additionally, a primary user equipment Radio Network Temporary Identifier (RNTI) field may be included and utilized to report changes (e.g., removal, change, addition) of the primary user equipment.

The primary user equipment receives control messages from the network and relays the content to the secondary user equipment via the device-to-device connection. As such, only the primary user equipment may monitor for broadcasted control message updates and only the primary user equipment may expend power for receiving the broadcasted control messages. The primary user equipment may also receive a unified Radio Resource Control (RRC) Reconfiguration message transmitted from the network. The primary user equipment may apply the configuration and relay the configuration to the secondary user equipment in the group. The secondary user equipment may confirm completion of the configuration to the primary user equipment and the primary user equipment may transmit an RRC Reconfiguration Complete message to the network.

The primary user equipment may also assign tasks or portions of tasks based on the device capabilities. Secondary user equipment may request particular tasks for assignment and/or may request offloading other tasks to additional secondary user equipment. For example, a secondary user equipment having a battery level below a threshold may request offloading tasks to preserve battery. The device capabilities may also be utilized in selection of a primary user equipment. The secondary user equipment may also share a set of statuses with the primary user equipment. The statuses may include a battery level and a Radio Resource Control state (e.g., idle, inactive, connected, out of service). The primary user equipment may assign tasks or portions of tasks based on the statuses of the secondary user equipment.

In certain instances, user equipment may require measurement gaps for performance of measurements. The measurement gaps interrupt transmission and reception of control signals and data. The primary user equipment may split the measurements across the group of user equipment to ensure that no measurement gaps are required. The group of user equipment may measure multiple carrier frequencies. The primary user equipment may split the measurement task and assign portions of the measurement task to one or more user equipment in the group. For example, a first user equipment may measure a first frequency or first set of frequencies and a second user equipment may measure a second frequency or second set of frequencies. If a secondary user equipment in the group is in a connected mode (e.g., actively transmitting and/or receiving data), the secondary user equipment may transmit a request to the primary user equipment to offload an assigned portion of the measurement task. As such, the primary user equipment may select another secondary user equipment and assign the portion of the measurement task to the other secondary user equipment.

Handover occurs when user equipment leave a coverage area of a first cell and enter a coverage area of a second cell. The primary user equipment performs cell measurements for the first cell and the second cell and determines whether the cell measurements satisfy a set of criteria. The primary user equipment transmits a measurement report to the first cell to trigger the handover. The first cell transmits a handover command to the primary user equipment to handover connection of all user equipment within the group to the second cell. The primary user equipment receives the handover command and transmits the handover command and target cell configuration to the secondary user equipment. The primary user equipment may receive a handover confirmation from the secondary user equipment and may transmit a handover complete message to the second cell.

In some instances, the primary user equipment performs a unified cell search for all user equipment in the group. The primary user equipment searches a list of frequencies or frequency bands and attempts to identify a suitable cell. The primary user equipment may receive System Information Block (SIB) and Master Information Block (MIB) associated with the suitable cell. The primary user equipment may broadcast cell information, such as the SIB and MIB, to the secondary user equipment to allow the secondary user equipment to camp on the suitable cell.

Alternatively, the primary user equipment may divide up the cell search between one or more user equipment in the group. The primary user equipment may determine one or more user equipment are capable of performing at least a portion of the cell search. For example, the primary user equipment may exclude one or more secondary user equipment based on a respective status (e.g., battery level) of the secondary user equipment. The primary user equipment may determine a list of frequencies or frequency bands to be searched and may split the list into portions. The primary user equipment may assign each portion to a user equipment in the group (e.g., primary user equipment, secondary user equipment). The secondary user equipment may inform the primary user equipment upon completion of searching the respective portion. In some instances, the secondary user equipment may also identify a suitable cell based on the searched portion. Alternatively, the secondary user equipment may indicate no suitable cells were identified in the searched portion. The primary user equipment may assign additional portions to be searched by the secondary user equipment. If a secondary user equipment identifies a suitable cell, the secondary user equipment may camp on the suitable cell and notify the primary user equipment. The secondary user equipment may also share the cell information and MIB/SIB with the primary user equipment. The primary user equipment may notify any other user equipment in the group and may request the other user equipment stop searching. Alternatively, the primary user equipment may wait until all portions have been searched. The primary user equipment may receive the search results from the secondary user equipment and may determine a suitable cell based on the search results. The primary user equipment may broadcast the cell information of the suitable cell to allow the secondary user equipments to camp on the suitable cell.

Additionally, paging reception may be offloaded to one or more user equipment in the group. For example, the primary user equipment may identify a device in the group that includes a dedicated wake-up receiver. All other user equipment may remain in a lower power mode than the dedicated paging device in the group. Accordingly, the other user equipment may preserve battery.

FIG. 1 is a block diagram of user equipment 10 (e.g., a mobile electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level).

The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FTC)), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

Figure 2:
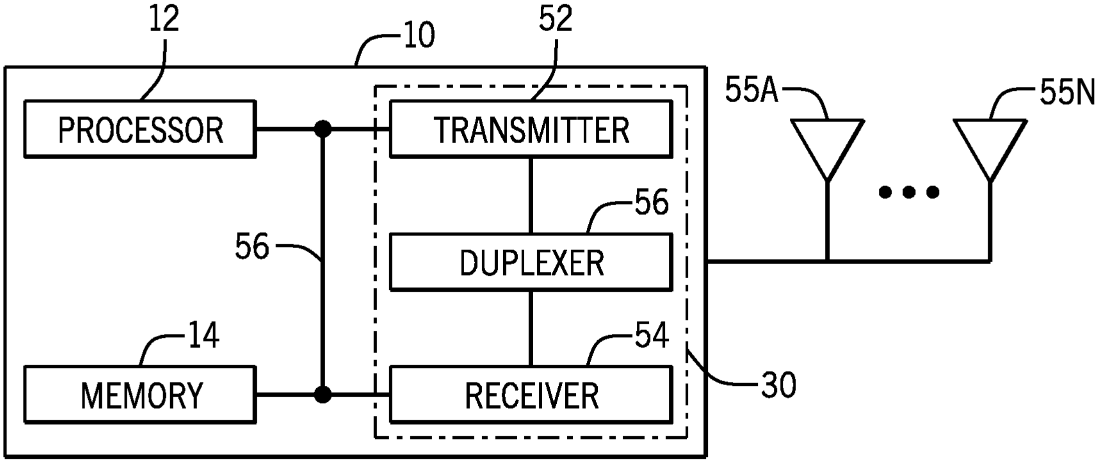
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

Moreover, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
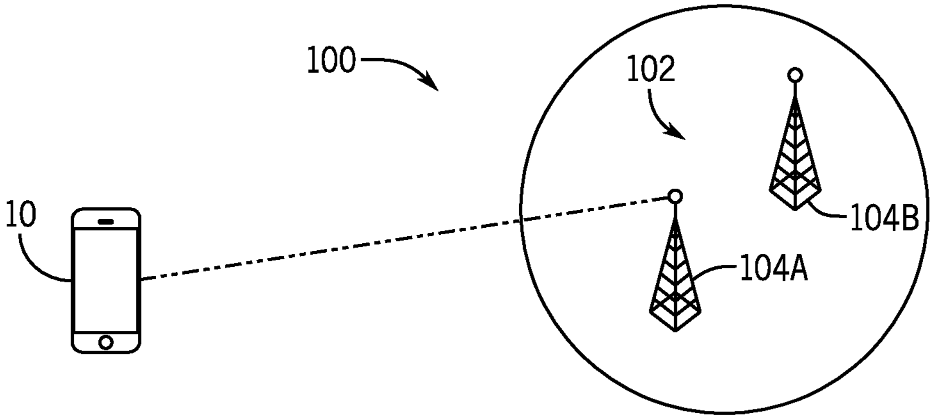
FIG. 3 is a schematic diagram of a communication system including the user equipment of FIG. 1 communicatively coupled to a wireless communication network supported by base stations, according to embodiments of the present disclosure.

FIG. 3 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the user equipment 10 shown in FIGS. 1 and 2, including one or more processors 12, the memory 14, the storage 16, the transceiver 30, the transmitter 52, and the receiver 54. It should be understood that while the present disclosure may use 5G/NR as an example specification or standard, the embodiments disclosed herein may apply to other suitable specifications or standards (e.g., such as the 4G/LTE specification). Moreover, the network 102 may include any suitable number of base stations 104 (e.g., one or more base stations 104, four or more base stations 104, ten or more base stations 104, and so on). Additionally or alternatively, the base stations 104 may include any number of user equipment 10 that communicatively couple to the wireless communication network.

Figure 4:
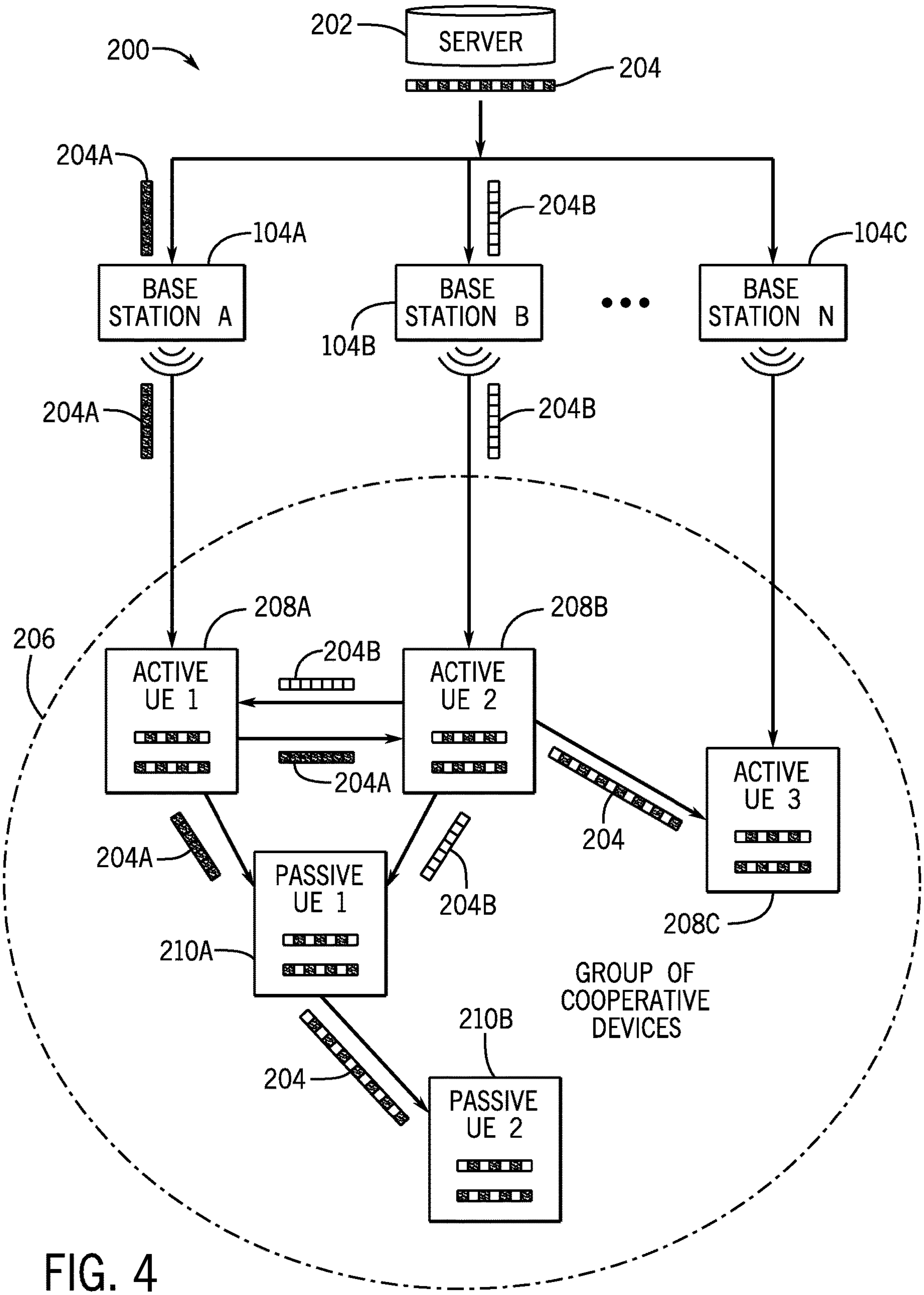
FIG. 4 is a schematic diagram of another embodiment of a communication system including a group of user equipment communicatively coupled to the wireless communication network of FIG. 3, according to embodiments of the present disclosure.

FIG. 4 is a schematic diagram of a communication system 200 including the base stations 104 (e.g., base stations 104A, 104B, 104C), an application server 202, and a group of user equipment 206. The application server 202 may include any suitable electronic device (e.g., a desktop personal computer, a laptop, a mobile electronic device, a tablet, a smartphone, a wearable device, or any other suitable computing device) and may include at least some of the components of the user equipment 10 shown in FIGS. 1 and 2, including one or more processors 12, the memory 14, the storage 16, the transceiver 30, the transmitter 52, and the receiver 54. The communication system 200 may include any suitable number of application servers 202 (e.g., one or more application servers 202, four or more application servers 202, and so on). The base stations 104 may provide access for the group of user equipment 206 to transfer data and/or control information to and from the application server 202. In certain embodiments, a first base station 104A may be associated with a different carrier or operator from a second base station 104B. Additionally or alternatively, one or more of the base stations 104 may operate using the same carrier. The group of user equipment 206 may cooperate for transferring data and/or control information. The group of user equipment 206 may include any number of active user equipment 208A, 208B, 208C (referred to collectively as active user equipment 208) and/or any number of passive user equipment 210A, 210B (referred to collectively as passive user equipment 210). Each user equipment (e.g., active user equipment 208, passive user equipment 210) may include any suitable electronic device and may be an example of the user equipment 10 shown in FIGS. 1 and 2. As such, each of the user equipment may include at least some of the components of the user equipment 10, such as one or more processors 12, the memory 14, the storage 16, the transceiver 30, the transmitter 52, and the receiver 54. Additionally, the group of user equipment 206 may include any suitable number of user equipment (e.g., any suitable number of active user equipment 208, any suitable number of passive user equipment 210).

Each of the active user equipment 208 may be communicatively coupled to the wireless communication network 102 (e.g., via at least one of the base stations 104). Additionally or alternatively, the active user equipment 208 may be communicatively coupled to other active user equipment 208 and/or at least one passive user equipment 210. For example, the active user equipment 208 may be communicatively coupled via any suitable communication technique, such as a device-to-device communication link, sidelink communication, peer-to-peer communication, and so forth. In certain embodiments, the active user equipment 208A may serve as a relay for at least one active user equipment 208 and/or at least one passive user equipment 210. For example, the active user equipment 208A may transfer data and/or control information received from one user equipment (e.g., active user equipment 208B, passive user equipment 210A) in the group of user equipment 206 to another user equipment (e.g., active user equipment 208C, passive user equipment 210B) in the group of user equipment 206.

In certain embodiments, any suitable number of active UE 208 may be communicatively coupled with any number of base stations 104. A target UE (e.g., first active UE 208A, first passive UE 210B) may request data from the wireless communication network 102. The group of UE 206 may coordinate and cooperate to transmit the request to the wireless communication network 102. Each active UE 208 may receive the data 204 and/or one or more sets 204A, 204B (e.g., a portion, a subset) of the data from the wireless communication network 102 via base stations 104. The active UEs 208 may transfer the sets of data to other active UEs 208 within the group of user equipment 206. The active UEs 208 may assemble the data based at least in part on the received sets of the data. The group of user equipment 206 may coordinate and cooperate to provide the data to the target UE. Accordingly, the target UE may receive the data and/or the data sets and may assemble the data based on the data sets.

Figure 5:
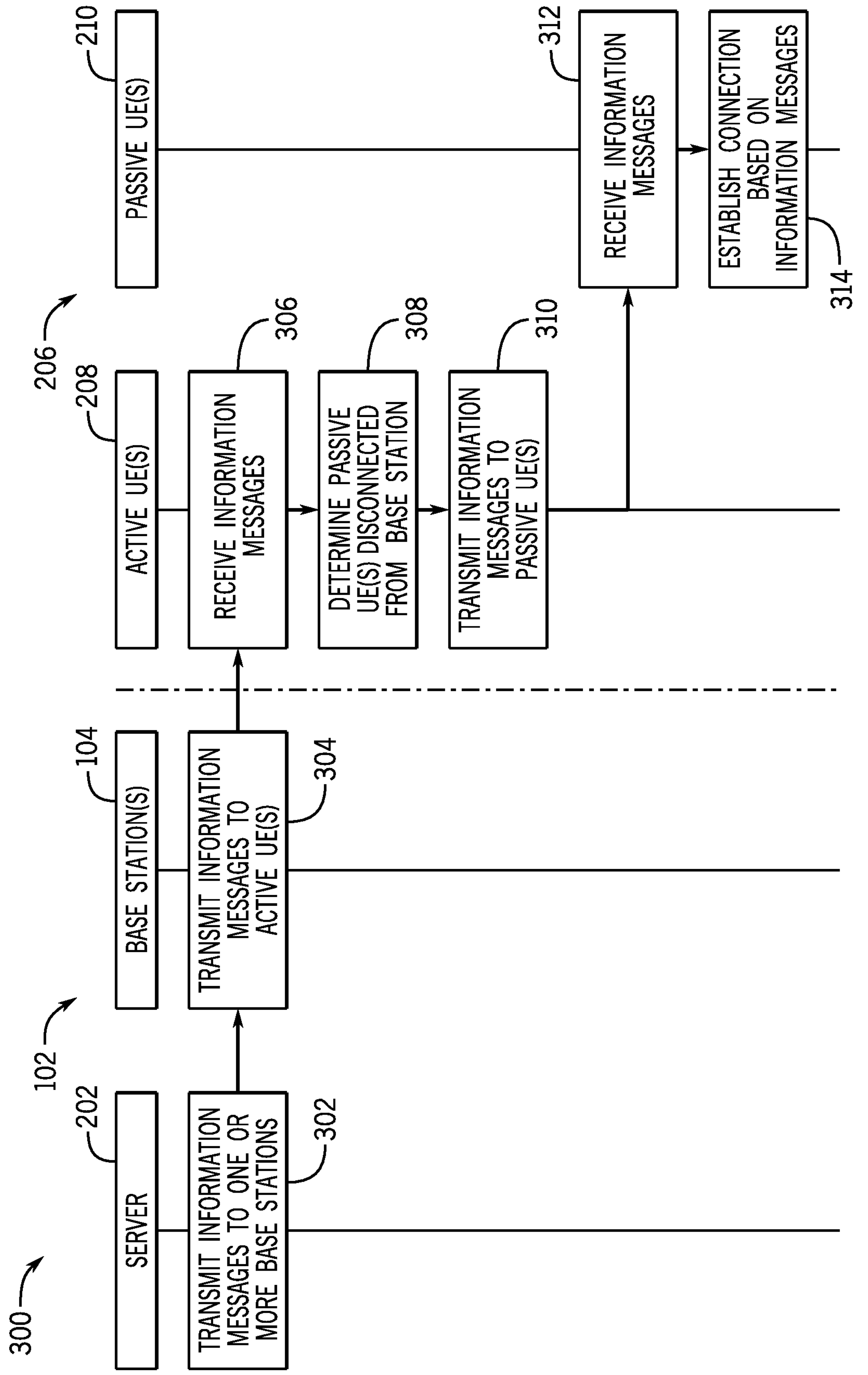
FIG. 5 is a flowchart of a method to transmit system information associated with the wireless communication network of FIG. 3, according to embodiments of the present disclosure.

With the foregoing in mind, FIG. 5 is a flowchart of a method 300 to transmit system information associated with the wireless communication network 102 of FIG. 3, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 300. In some embodiments, the method 300 may be implemented by executing instructions stored in a tangible, non-transitory, computer-readable medium, such as the one or more respective memories 14 or storages 16 of these devices, using the processors 12. For example, the method 300 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the network 102 and/or the application server 202 broadcasts or transmits information messages to the base stations 104. The information messages may include system information blocks (SIB), master information blocks (MIB), and so forth. The base stations 104 may receive the information messages and may transmit (block 304) the information messages to any number of active UEs 208. For example, the base station 104 may receive information associated with a number of active UEs 208 in the group of user equipment 206. The base station 104 may generate a number of portions of the information messages based at least in part on the number of active UEs 208 in the group of user equipment 206. For example, the base station 104 may receive (e.g., generate) a number of portions equal to a number of active UEs 208. As such, each active UE 208 may receive at least one portion from the wireless communication network 102. The active UEs 208 may receive (block 306) the information messages.

After receiving the information messages, the active UEs 208 may determine (block 308) any number of passive UEs 210 are disconnected from the wireless communication network 102. The active UEs 208 may transmit (block 310) to any number of passive UEs 210 within the group of UE 206. The passive UEs 210 may receive (block 312) the information messages and may establish (block 314) a connection with the wireless communication network 102 based on the information messages. Upon connecting to the wireless communication network 102, the passive UEs 210 may transmit a status change to the primary UE. The status change may indicate the passive UEs 210 are no longer disconnected from the wireless communication network 102. The primary UE may assign the previous passive UEs 210 as new active UEs 208.

Figure 6:
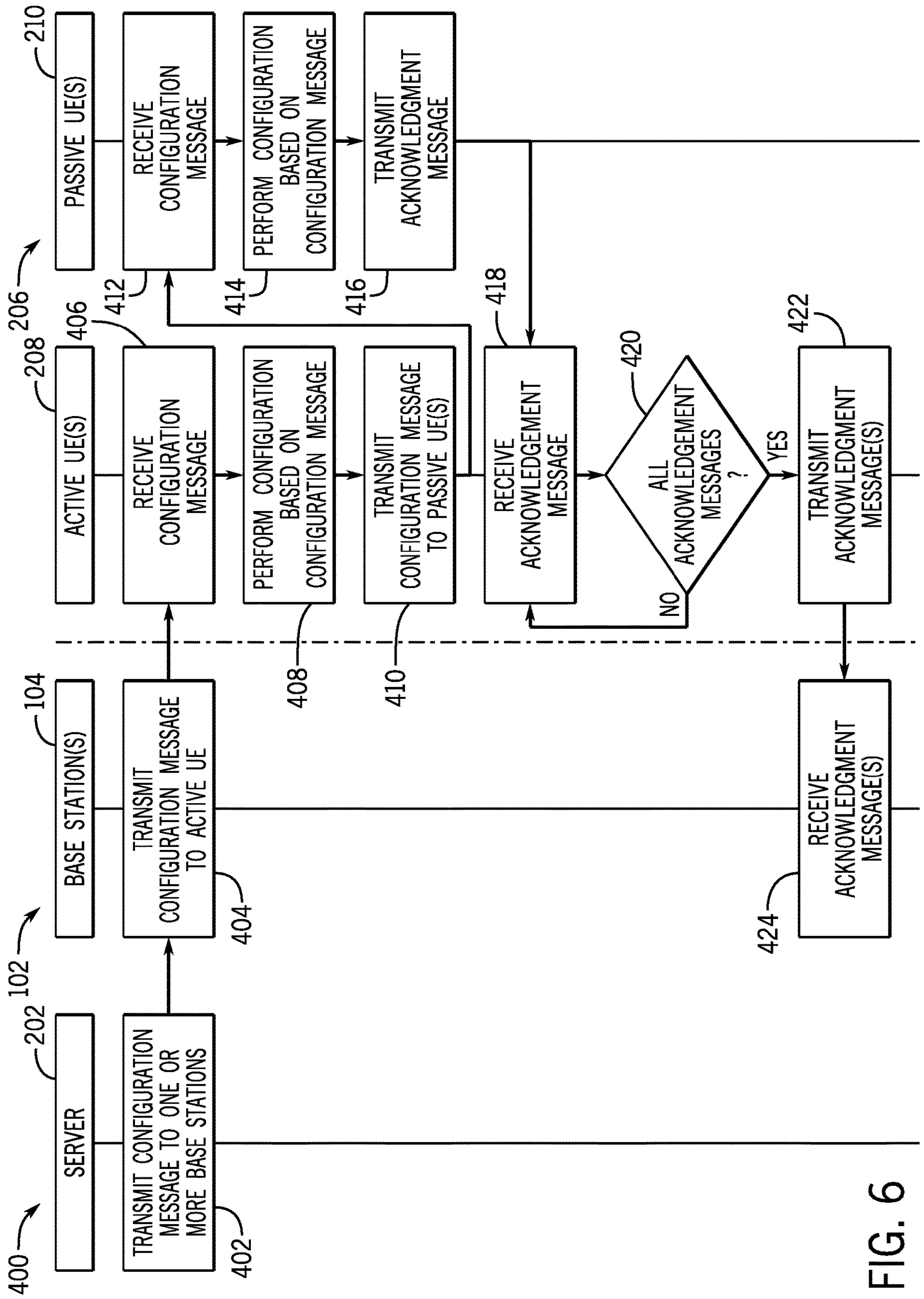
FIG. 6 is a flowchart of a method to reconfigure user equipment of the group of user equipment of FIG. 4, according to embodiments of the present disclosure.

With the foregoing in mind, FIG. 6 is a flowchart of a method 400 to reconfigure user equipment 10 of the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 400. In some embodiments, the method 400 may be implemented by executing instructions stored in a tangible, non-transitory, computer-readable medium, such as the one or more respective memories 14 or storages 16 of these devices, using the processors 12. For example, the method 400 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the network 102 and/or the application server 202 broadcasts or transmits a configuration message to the base stations 104. In certain embodiments, the configuration message may include a Radio Resource Control (RRC) reconfiguration message. The configuration message may be associated with a set of the user equipment 10 (e.g., all active UEs 208, all passive UEs 210, all UEs 10, any number of passive UEs 210, any number of active UEs 208, or any combination thereof) in the group of user equipment 206. The base stations 104 may receive the configuration message and may transmit (block 404) the configuration message to active UEs 208. The active UEs 208 may receive (block 406) the configuration message and may perform (block 408) configuration of the associated active UEs 208 based on the configuration message. The active UEs 208 may transmit (block 410) the configuration message to any number of the passive UEs 210. In certain embodiments, the configuration message may include a set of device identifiers. The set of device identifiers may identify corresponding user equipment within the group of user equipment 206 that may receive the configuration message and/or perform the configuration based on the configuration message.

The passive UEs 210 may receive (block 412) the configuration message. In response to receiving the configuration message, the passive UEs 210 may perform (block 414) configuration based on the configuration message. The passive UEs 210 may also transmit (block 416) an acknowledgement message based on completion of the configuration. The active UEs 208 may receive (block 418) the acknowledgement messages and/or may transmit the acknowledgment messages to the primary UE. The active UEs 208 may determine (block 420) whether all user equipment associated with the configuration message have completed configuration. For example, the primary user equipment may determine whether a number of acknowledgment messages correlates with a number of device identifiers associated with the configuration message. Based on the number of acknowledgement messages correlating with the number of device identifiers (YES path of block 420), the active UEs 208 may transmit (block 422) the acknowledgment messages to the base stations 104. The base stations 104 may receive (block 424) the acknowledgement messages from the active UEs 208. Alternatively, the primary user equipment may determine the number of acknowledgement messages does not correlate with the number of device identifiers (NO path of block 420). As such, the active UEs 208 may return to block 418 to receive additional acknowledgment messages.

Figure 7:
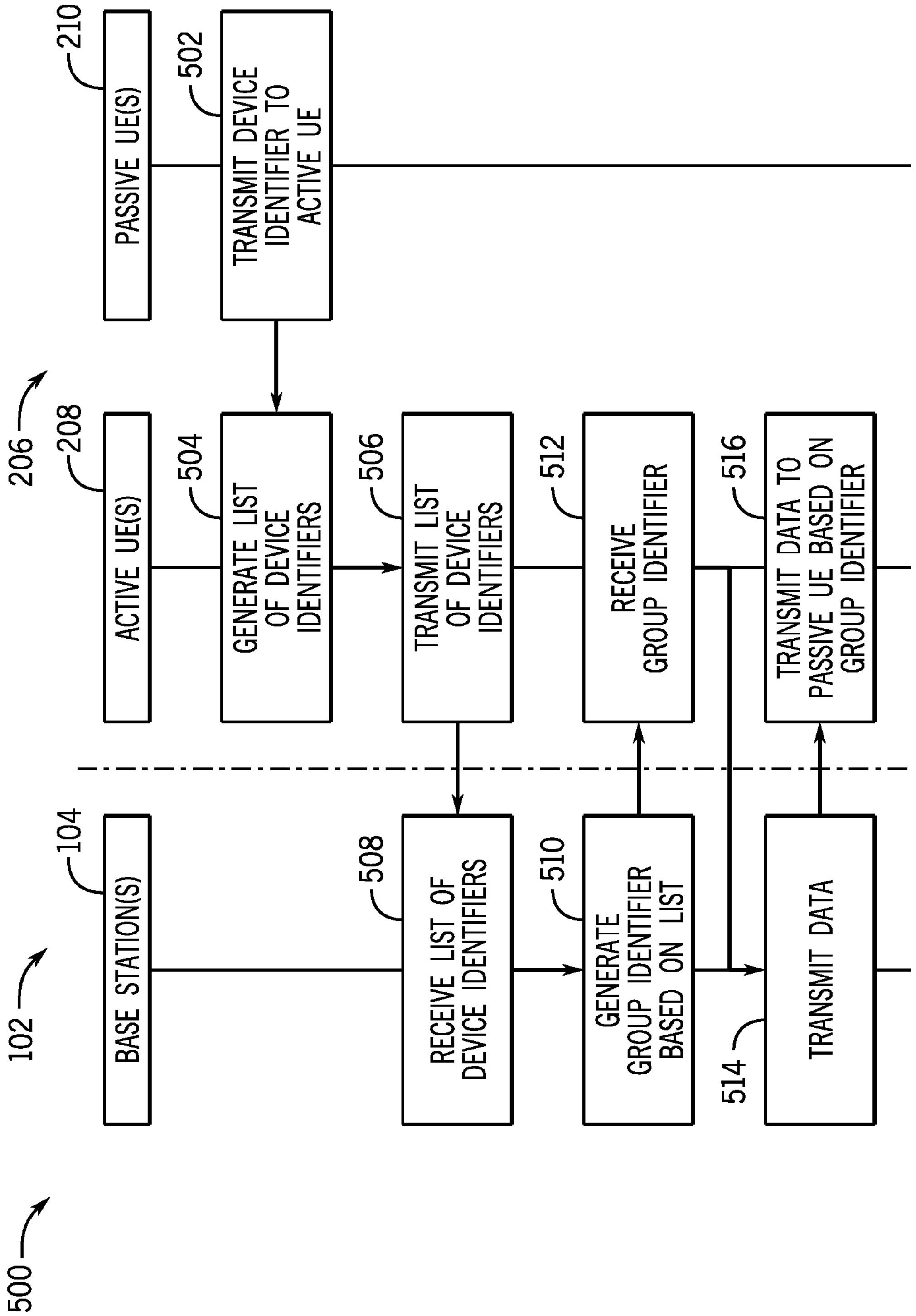
FIG. 7 is a flowchart of a method to generate a group identifier associated with the group of user equipment of FIG. 4, according to embodiments of the present disclosure.

With the foregoing in mind, FIG. 7 is a flowchart of a method 500 to generate a group identifier associated with the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 500. In some embodiments, the method 500 may be implemented by executing instructions stored in a tangible, non-transitory, computer-readable medium, such as the one or more respective memories 14 or storages 16 of these devices, using the processors 12. For example, the method 500 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 500 is described using steps in a specific sequence, it should be understood that the present disclosure contemplates that the described steps may be performed in different sequences than the sequence illustrated, and certain described steps may be skipped or not performed altogether.

One or more passive UEs 210 may transmit (block 502) a first set of device identifiers associated with UE within the group of UE 206 to one or more active UEs 208. Additionally or alternatively, the active UEs 208 may receive a second set of device identifiers from one or more additional active UEs 208. The active UEs may generate (block 504) a list of device identifiers based at least in part on the first set, the second set, or both. The list of device identifiers may also include a primary user equipment Radio Network Temporary Identifier (RNTI) field that may be utilized to report changes (e.g., removal, change, addition) of the primary user equipment. The active UEs 208 may transmit (block 506) the list of device identifiers to the wireless communication network 102 via the base stations 104. As such, the wireless communication network 102 may receive the list of device identifiers via wireless communication with multiple active UEs 208 within the group of UEs 206. Additionally, the active UEs 208 may transmit the list of device identifiers to multiple base stations 104. For example, the first active UE 208A may transmit a first portion of the list of device identifiers to the first base station 104A and the second active UE 208B may transmit a second portion of the list of device identifiers to the second base station 104B.

At block 508, the base station 104 may receive the list of device identifiers. The base station 104 may generate (block 510) a group identifier based on the list of device identifiers. The wireless communication network 102 may assign the group identifier, such as a Group Radio Network Temporary Identifier (G-RNTI), to the group of user equipment 206 and may transmit the G-RNTI to the primary user equipment. Accordingly, the wireless communication network 102 and/or the primary user equipment may utilize the G-RNTI to identify the group of UE 206 for control signaling. To add or remove a secondary user equipment, the primary user equipment may report the G-RNTI and the corresponding device specific identifier for the secondary user equipment to the wireless communication network 102. The base stations 104 may transmit the group identifier to the active UEs 208. In certain embodiments, the active UEs 208 may receive (block 512) the group identifier and may transmit the group identifier to the primary UE and/or the passive UEs 210. The base stations 104 may broadcast or transmit (block 514) data associated with the group identifier. One or more of the active UEs 208 may receive the data and may identify the group identifier. As such, the active UEs 208 may transmit (block 516) the data to other UE 10 within the group of UE 206, such as the passive UEs 210, other active UEs 208, the primary UE, and so forth.

Figure 8:
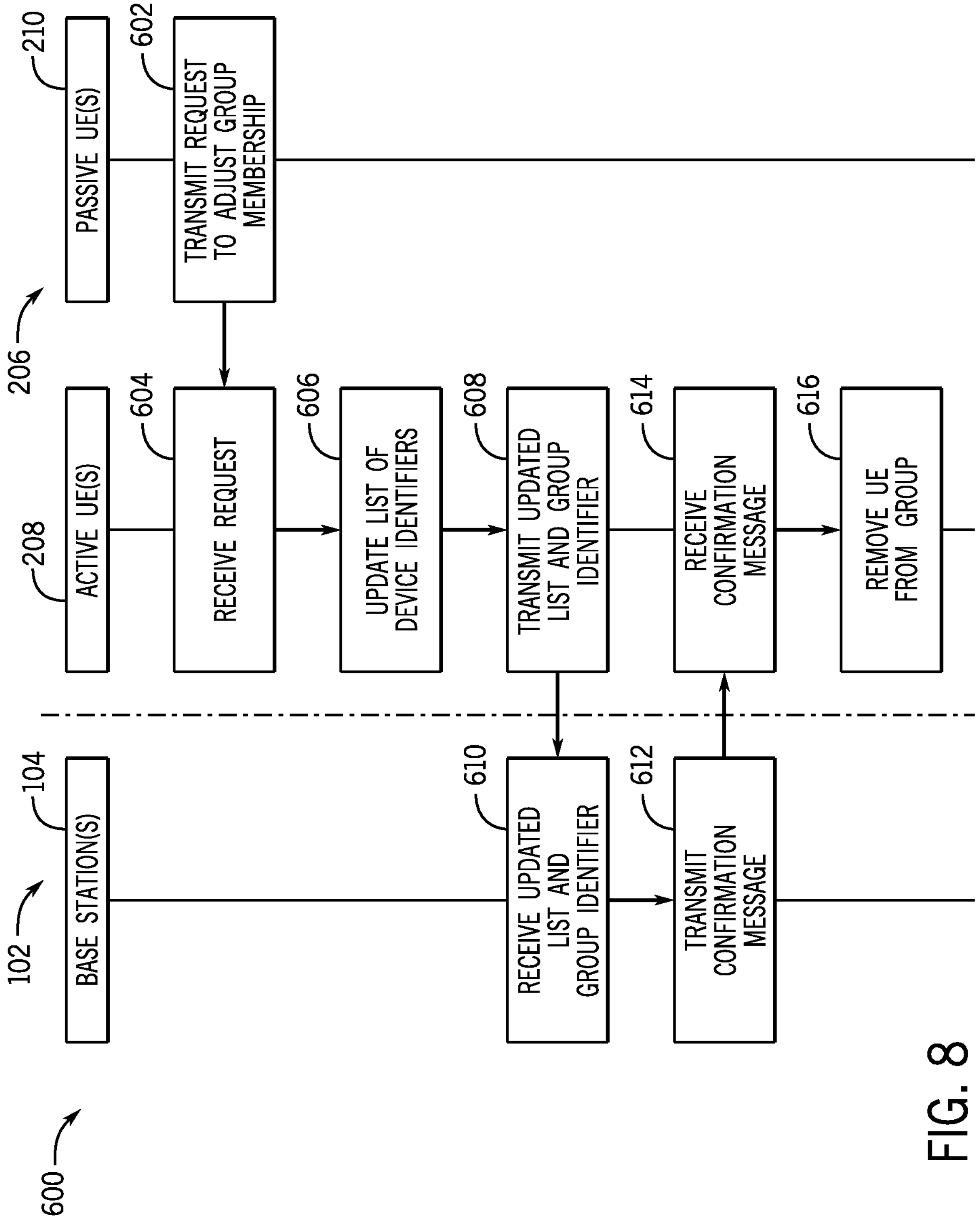
FIG. 8 is a flowchart of a method to adjust membership of the group of user equipment of FIG. 4, according to embodiments of the present disclosure.

With the foregoing in mind, FIG. 8 is a flowchart of a method 600 to adjust membership of the group of user equipment of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 600. In some embodiments, the method 600 may be implemented by executing instructions stored in a tangible, non-transitory, computer-readable medium, such as the one or more respective memories 14 or storages 16 of these devices, using the processors 12. For example, the method 600 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 600 is described using steps in a specific sequence, it should be understood that the present disclosure contemplates that the described steps may be performed in different sequences than the sequence illustrated, and certain described steps may be skipped or not performed altogether.

One or more passive UEs 210 may transmit (block 602) a request to adjust membership in the group of UE 206. For example, the passive UEs 210 may transmit a request to join or leave the group of UE 206. The active UEs 208 may receive (block 604) the request from the passive UEs 210. The active UEs 208 may update (block 606) the list of device identifiers associated with the group of UE 206. For example, the primary UE may remove one or more device identifiers, add one or more device identifiers, or both. The active UE 208 may transmit (block 608) the updated list of device identifiers and the group identifier to the wireless communication network 102 via the base stations 104. The base stations 104 may receive (block 610) the updated list of device identifiers and the group identifier. The base stations 104 may also transmit (block 612) a confirmation message to the active UEs 208. The active UEs 208 may receive (block 614) the confirmation message and may add and/or remove any number of UE from the group of UE 206. For example, the active UE 208 may establish one or more device-to-device communication links with new UE joining the group of UE 206 and/or may terminate one or more previous device-to-device communication links with UE leaving the group of UE 206.

Figure 9:
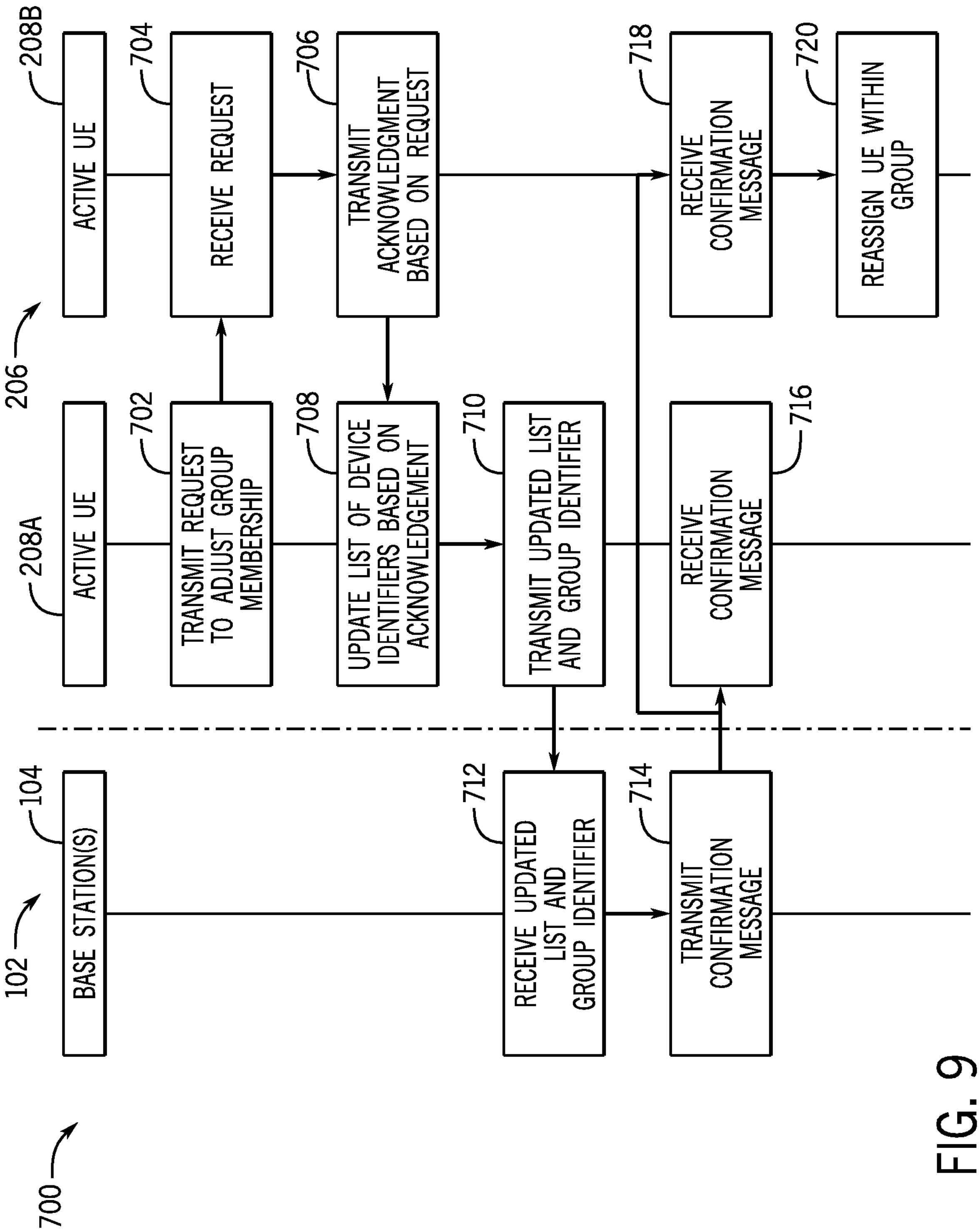
FIG. 9 is a flowchart of a method to assign a new primary user equipment of the group of user equipment of FIG. 4, according to embodiments of the present disclosure.

With the foregoing in mind, FIG. 9 is a flowchart of a method 700 to assign a new primary user equipment of the group of user equipment of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 700. In some embodiments, the method 700 may be implemented by executing instructions stored in a tangible, non-transitory, computer-readable medium, such as the one or more respective memories 14 or storages 16 of these devices, using the processors 12. For example, the method 700 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 700 is described using steps in a specific sequence, it should be understood that the present disclosure contemplates that the described steps may be performed in different sequences than the sequence illustrated, and certain described steps may be skipped or not performed altogether.

At block 702, the first active UE 208A may transmit a request to adjust group membership. In certain embodiments, the first active UE 208A may request a change in primary UE. For example, the first active UE 208A may request reassignment of the primary UE role to another active UE 208. The first active UE 208A may transmit the request to a candidate active UE, such as second active UE 208B. The second active UE 208B may receive (block 704) the request and may transmit (block 706) an acknowledgment based on the request. For example, the second active UE 208B may transmit the acknowledgment indicating approval of the reassignment of the primary UE role to the second active UE 208B. The first active UE 208A may update (block 708) the list of device identifiers based on the acknowledgment. For example, the first active UE 208A may update the primary user equipment RNTI field to assign the second active UE 208B as the primary UE. One or more active UEs 208 may transmit (block 710) the updated list of device identifiers and the group identifier to the base stations 104.

The base stations 104 may receive (block 712) the updated list of device identifiers and the group identifier. The base stations 104 may transmit (block 714) a confirmation message to one or more of the active UEs 208. For example, the base stations 104 may transmit the confirmation message to the second active UE 208B based on the new primary user equipment RNTI field. The first active UE 208A may receive (block 716) the confirmation message and the second active UE 208B may also receive (block 718) the confirmation message. The second active UE 208B may reassign (block 720) the primary UE role within the group of UE 206. Additionally, the active UEs 208 may transmit the updated primary user equipment RNTI field to any number of UEs within the group of UE 206.

Figure 10:
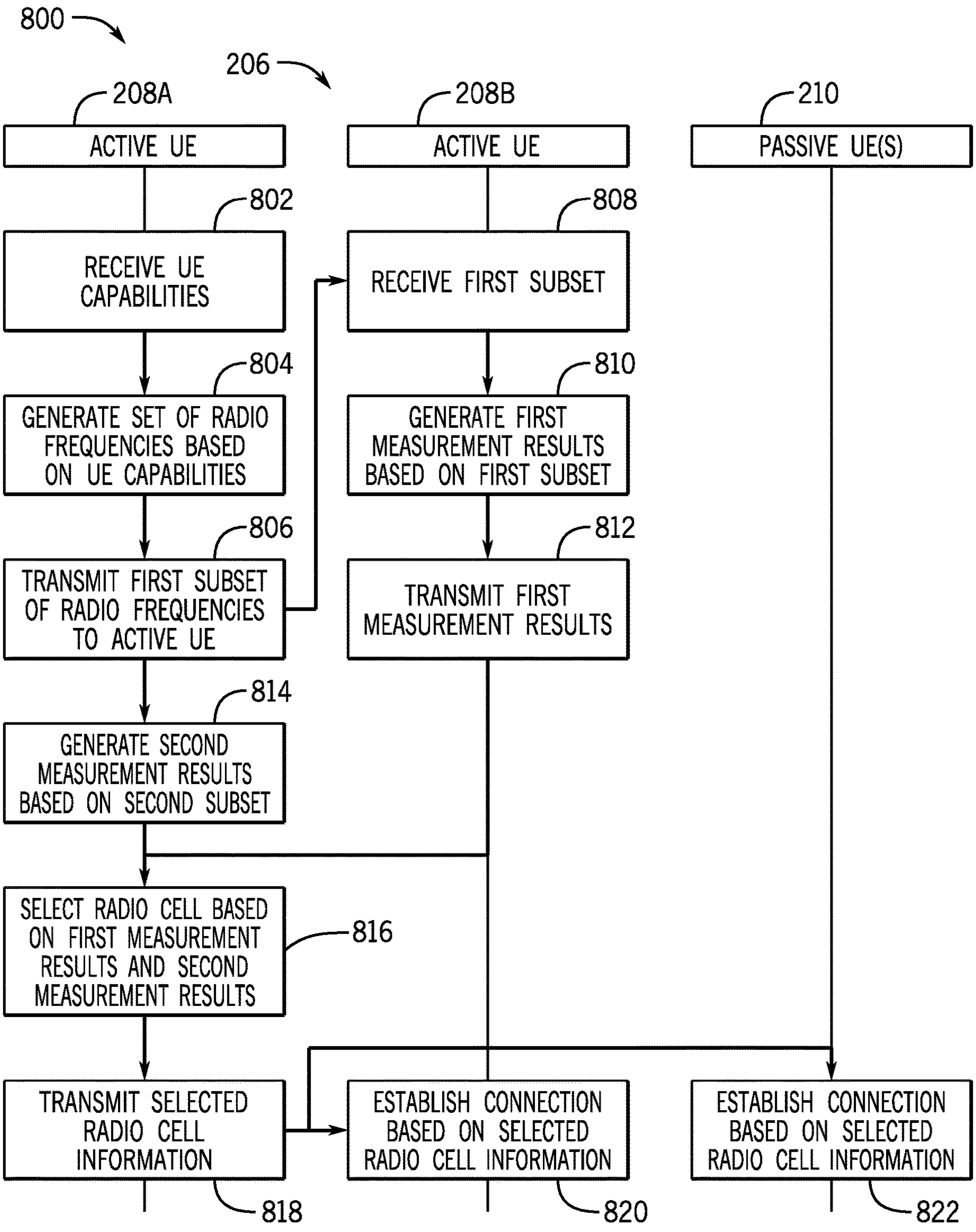
FIG. 10 is a flowchart of a method to perform cell measurements using active user equipment within the group of user equipment of FIG. 4, according to embodiments of the present disclosure.

With the foregoing in mind, FIG. 10 is a flowchart of a method 800 to perform cell measurements using active user equipment within the group of user equipment of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 700. In some embodiments, the method 700 may be implemented by executing instructions stored in a tangible, non-transitory, computer-readable medium, such as the one or more respective memories 14 or storages 16 of these devices, using the processors 12. For example, the method 700 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 700 is described using steps in a specific sequence, it should be understood that the present disclosure contemplates that the described steps may be performed in different sequences than the sequence illustrated, and certain described steps may be skipped or not performed altogether.

In certain instances, user equipment may require measurement gaps for performance of measurements. The measurement gaps interrupt transmission and reception of control signals and data. The primary user equipment may split the measurements across the group of user equipment 206 to ensure that no measurement gaps are required. At block 802, the first active UE 208A may receive a set of UE capabilities. The group of UE 206 may measure multiple carrier frequencies. The set of UE capabilities may include communication capabilities, computing and/or processing capabilities, sensing capabilities, and so forth. The first active UE 208A may generate (block 804) a set of radio frequencies based on the set of UE capabilities. The primary user equipment may split the measurement task and assign portions of the measurement task to one or more user equipment in the group of UE 206. Additionally or alternatively, if a secondary user equipment in the group is in a connected mode (e.g., actively transmitting and/or receiving data), the secondary user equipment may transmit a request to the primary user equipment to offload an assigned portion of the measurement task. As such, the primary user equipment may select another secondary user equipment and assign the portion of the measurement task to the other secondary user equipment. The first active UE 208A may generate one or more subsets of the set of radio frequencies based at least in part on a number of active UEs 208 within the group of UE 206. As such, the first active UE 208A may generate any number of subsets to divide the task of cell measurement between the active UE 208 within the group of UE 206. The first active UE 208A may transmit (block 806) a first subset of radio frequencies to a first set of active UEs 208. The first set of active UEs 208 may include the second active UE 208B. The second active UE 208B may receive (block 808) the first subset of radio frequencies and may perform measurements based on the first subset of radio frequencies. The second active UE 208B may generate (block 810) a first set of measurement results based on the first subset of radio frequencies. The second active UE 208B may transmit (block 812) the first set of measurement results to the first active UE 208A. The first active UE 208A may receive a second subset of radio frequencies and may perform measurements based on the second subset of radio frequencies. The first active UE 208A may generate (block 814) the second measurement results based on the second subset of the radio frequencies.

The first active UE 208A may select (block 816) a radio cell based at least in part on the first measurements results and the second measurement results. For example, the first active UE 208A may determine a suitable radio cell based on signal quality from the measurement results. The first active UE 208A may transmit (block 818) the selected radio cell information to one or more active UEs 208 and/or one or more passive UEs 210. The second active UE 208B may receive the selected radio cell information and may establish (block 820) a connection with the wireless communication network 102 based on the selected radio cell information. Additionally or alternatively, the first active UE 208A may establish a connection with the wireless communication network 102 based on the selected radio cell information. In certain embodiments, the passive UEs 210 may establish (block 822) a connection with the wireless communication network 102 based on the selected radio cell information. As such, the passive UEs 210 may be reassigned as new active UEs 208.

Figure 11:
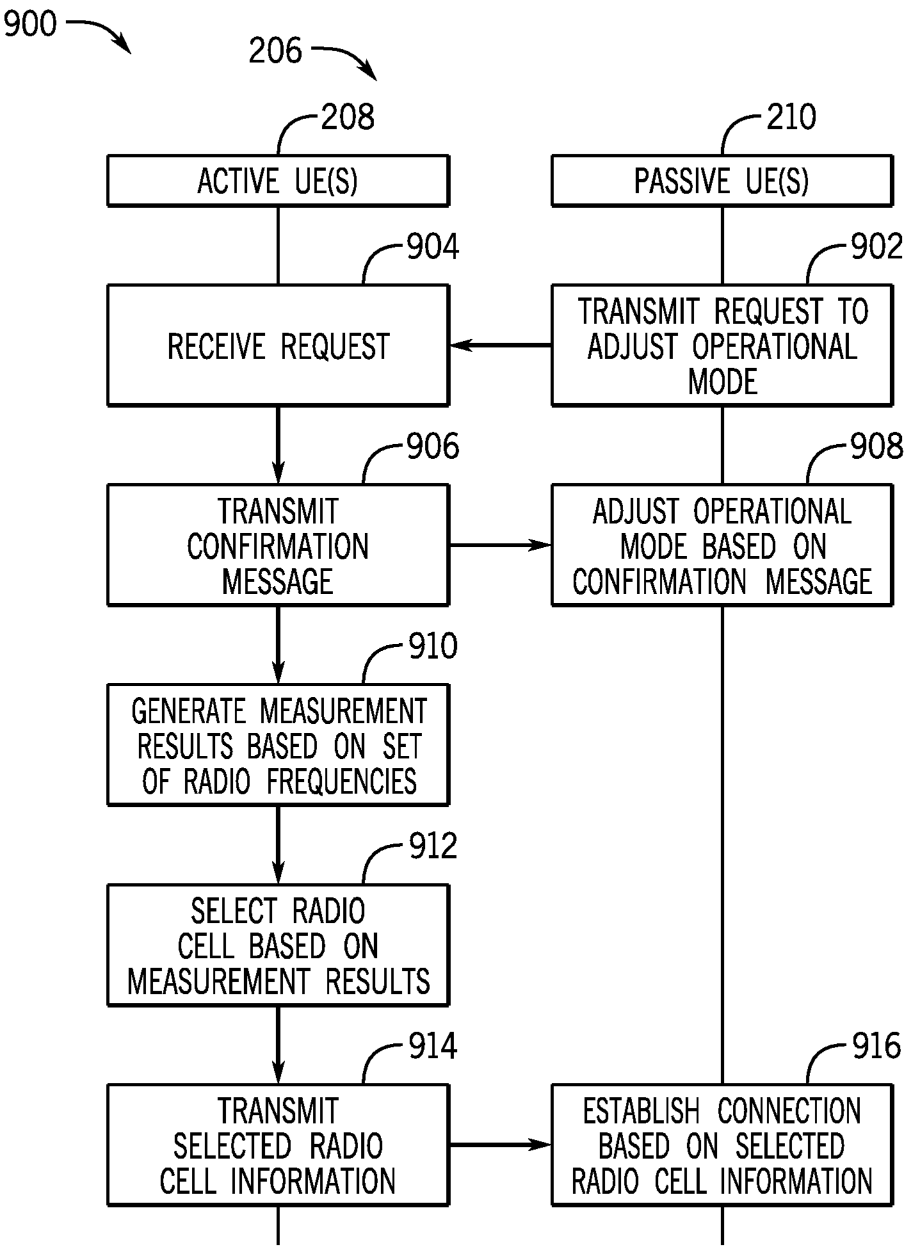
FIG. 11 is a flowchart of a method to offload cell measurements within the group of user equipment of FIG. 4, according to embodiments of the present disclosure.

With the foregoing in mind, FIG. 11 is a flowchart of a method 900 to offload paging to active user equipment 208 of the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 900. In some embodiments, the method 900 may be implemented by executing instructions stored in a tangible, non-transitory, computer-readable medium, such as the one or more respective memories 14 or storages 16 of these devices, using the processors 12. For example, the method 900 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 900 is described using steps in a specific sequence, it should be understood that the present disclosure contemplates that the described steps may be performed in different sequences than the sequence illustrated, and certain described steps may be skipped or not performed altogether.

At block 902, one or more passive UEs 210 may transmit a request to adjust an operational mode. For example, the passive UEs 210 may request to enter an idle mode and offload cell measurements to other UE within the group of UE 206. Additionally or alternatively, any number of active UEs 208 may transmit a request to enter the idle mode and offload cell measurements. The active UE 208 may receive (block 904) and may transmit (block 906) a confirmation message based on the request. The active UE 208 may determine whether sufficient resources are available to perform the cell measurements without the requesting UEs. The passive UEs 210 may receive the confirmation message and may adjust (block 908) the operational mode based on reception of the confirmation message.

The active UEs 208 may generate (block 910) measurement results based on a set of radio frequencies. The active UEs 208 may analyze the measurement results and may select (block 912) a suitable radio cell based on the measurement results. For example, the suitable radio cell may satisfy a signal quality threshold (e.g., SNR threshold, SSRI threshold, and so forth). The active UEs 208 may transmit (block 914) the selected radio cell information to one or more other UEs within the group of UE 206. The passive UEs 210 may establish (block 916) a connection with the wireless communication network 102 based on the selected radio cell information. As such, the passive UEs 210 may be reassigned as new active UEs 208. Additionally or alternatively, the active UEs 208 may transmit the selected radio cell information to one or more other active UEs 208. The active UEs 208 may receive the selected radio cell information and may establish a connection with the wireless communication network 102 based on the selected radio cell information.

Figure 12:
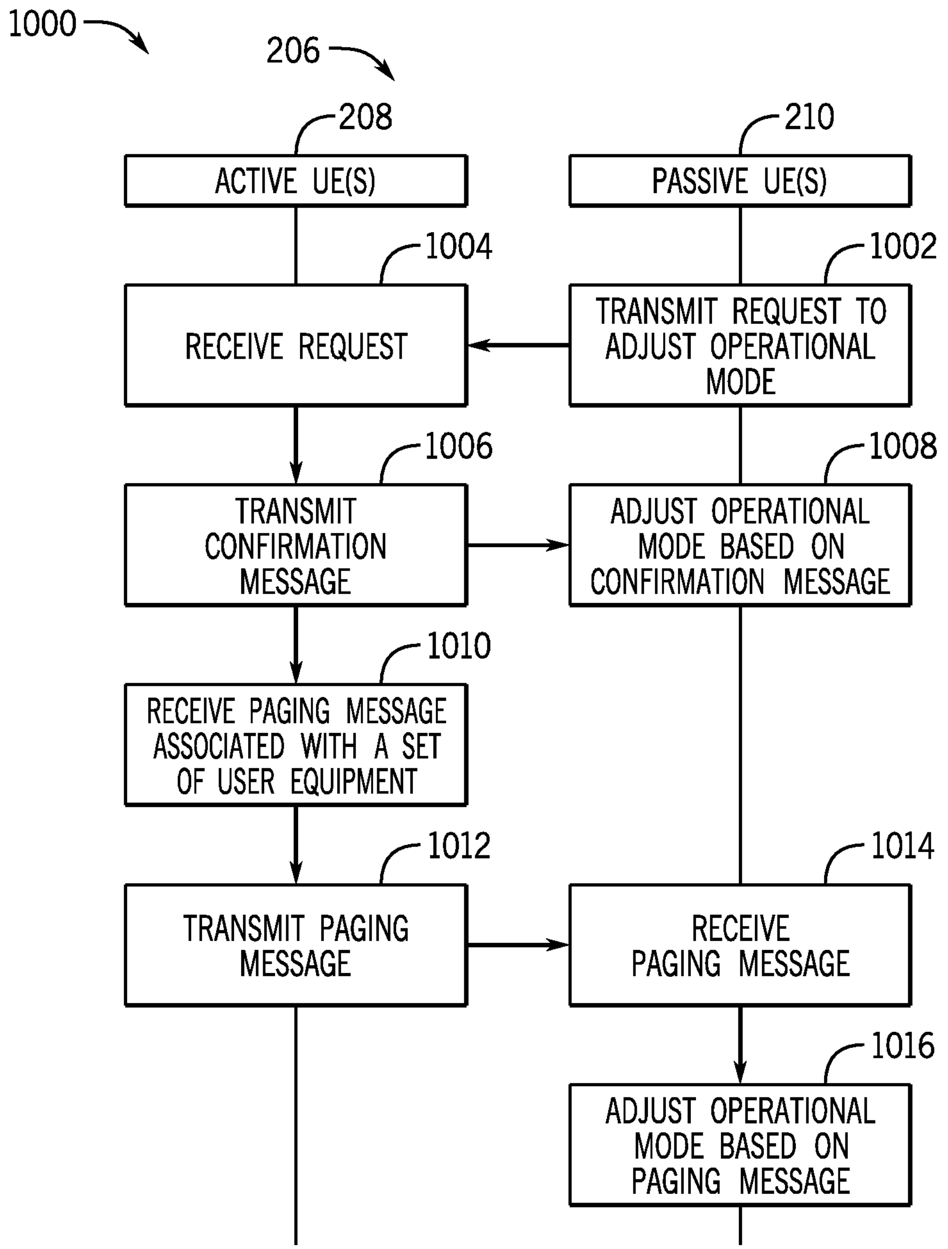
FIG. 12 is a flowchart of a method to offload paging to active user equipment of the group of user equipment of FIG. 4, according to embodiments of the present disclosure.

FIG. 12 is a flowchart of a method 1000 to method to offload paging to active user equipment of the group of user equipment of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1000. In some embodiments, the method 1000 may be implemented by executing instructions stored in a tangible, non-transitory, computer-readable medium, such as the one or more respective memories 14 or storages 16 of these devices, using the processors 12. For example, the method 1000 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1000 is described using steps in a specific sequence, it should be understood that the present disclosure contemplates that the described steps may be performed in different sequences than the sequence illustrated, and certain described steps may be skipped or not performed altogether.

Paging reception may be offloaded to one or more active UE 208 within the group of UE 206. For example, the primary UE may identify an active UE 208 that includes a dedicated wake-up receiver. Any number of UE 10 within the group of UE 206 may remain in a lower power mode than the dedicated paging UE within the group of UE 206. At block 1002, one or more passive UEs 210 may transmit a request to adjust an operational mode. For example, the passive UEs 210 may request to enter an idle mode and offload paging to other UE within the group of UE 206. Additionally or alternatively, any number of active UEs 208 may transmit a request to enter the idle mode and offload paging. The active UE 208 may receive (block 1004) and may transmit (block 1006) a confirmation message based on the request. The active UE 208 may determine whether sufficient resources are available to perform the paging without the requesting UEs. Additionally, the active UE 208 may determine whether any UE includes a dedicated wake-up receiver to perform the paging. The passive UEs 210 may receive the confirmation message and may adjust (block 1008) the operational mode based on reception of the confirmation message.

The active UEs 208 may receive (block 1010) a paging message associated with a set of user equipment. For example, the paging message may include a set of device identifiers associated with a set of user equipment 10 within the group of UE 206. The active UEs 208 may analyze the paging message and may determine the UE 10 associated with the paging message. The active UEs 208 may transmit (block 1012) the paging message based on the set of device identifiers. The passive UEs 210 may receive (block 1014) the paging message from one or more active UEs 208. Additionally or alternatively, the active UEs 208 may transmit the paging message to one or more other active UEs 208 based on the set of device identifiers. The passive UEs 210 may adjust (block 1016) an operational mode based on the paging message. For example, the passive UEs 210 may exit the idle mode and/or may enter an active mode in response to receiving the paging message.

Figure 13:
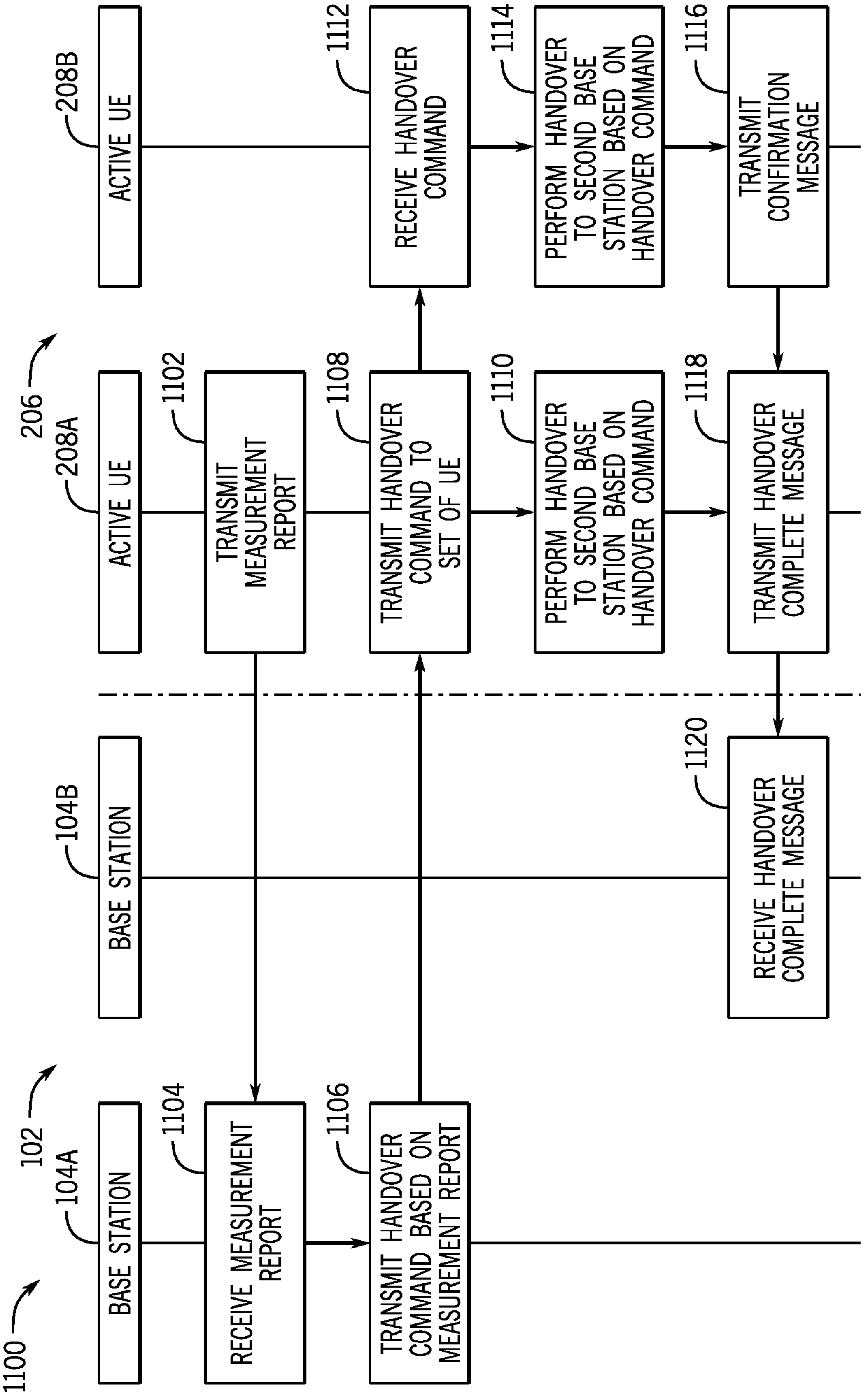
FIG. 13 is a flowchart of a method to perform handover for the group of user equipment of FIG. 4, according to embodiments of the present disclosure.

With the foregoing in mind, FIG. 13 is a flowchart of a method 1100 to perform handover for the group of user equipment of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1100. In some embodiments, the method 1100 may be implemented by executing instructions stored in a tangible, non-transitory, computer-readable medium, such as the one or more respective memories 14 or storages 16 of these devices, using the processors 12. For example, the method 1100 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1100 is described using steps in a specific sequence, it should be understood that the present disclosure contemplates that the described steps may be performed in different sequences than the sequence illustrated, and certain described steps may be skipped or not performed altogether.

Handover occurs when user equipment leave a coverage area of a first base station 104A and enter a coverage area of a second base station 104B. The primary user equipment performs cell measurements for the first base station 104A and the second base station 104B and determines whether the cell measurements satisfy a set of criteria. At block 1102, one or more active UEs 208, such as first active UE 208A, may transmit a measurement report to the first base station 104A to trigger handover. The first base station 104A may receive (block 1104) the measurement report and may transmit (block 1106) a handover command based on the measurement report. The first base station 104A may transmit the handover command to one or more active UEs 208. The first active UE 208A may receive the handover command and may transmit (block 1108) the handover command to any number of other active UEs 208, such as second active UE 208B, within the group of UE 206 and/or any number of passive UEs 210.

The first active UE 208A may perform (block 1110) the handover to the second base station 104B based on the handover command. As such, the first active UE 208A may connect to the second base station 104B and may disconnect from the first base station 104A. Accordingly, the first active UE 208A may maintain connection to the wireless communication network 102. The second active UE 208B may receive (block 1112) the handover command from the first active UE 208A. The second active UE 208B may perform (block 1114) the handover to the second base station 104B based on the handover command. As such, the second active UE 208B may connect to the second base station 104B and may disconnect from the first base station 104A. The second active UE 208B may transmit (block 1116) a confirmation message to the first active UE 208A upon completion of the handover. The first active UE 208A may transmit (block 1118) a handover complete message upon receiving confirmation messages from all active UEs 208 within the group of UE 206. The second base station 104B may receive (block 1120) the handover complete message and may begin communications with the active UE 208 of the group of UE 206.

In an embodiment, an electronic device may include a transmitter, a receiver; and a processor coupled to the transmitter and the receiver. The processor may receive a set of user equipment attributes associated with a group of user equipment and receive a set of radio frequencies associated with a wireless communication network. The processor may also transmit a first subset of the set of radio frequencies to a first user equipment of the group of user equipment, receive a set of measurements associated with the first subset of the set of radio frequencies, establish a connection with the wireless communication network based at least in part on the set of measurements.

The processor may also perform a second set of measurements associated with a second subset of the set of radio frequencies and communicate radio cell information based on the first set of measurements and the second set of measurements. The processor may also transmit the radio cell information to a second user equipment of the group of user equipment.

The processor may cause the second user equipment to establish a connection with the wireless communication network based at least in part on the radio cell information. The radio cell information may include a master information block (MIB), a system information block (SIB), or both.

The processor may transmit a second subset of the set of radio frequencies to a second user equipment of the group of user equipment and receive a second set of measurements associated with the second subset of the set of radio frequencies from the second user equipment.

The processor may also select radio cell information based at least in part on the first set of measurements results and the second set of measurements and transmit the radio cell information to the first user equipment and the second user equipment.

In another embodiment, a method includes transmitting, at a transmitter of a first user equipment, a request to adjust an operational mode of the first user equipment to a second user equipment, receiving, at a receiver of the first user equipment, a confirmation message associated with the request from the second user equipment, adjusting the operational mode based on the confirmation message, receiving, at the receiver, radio cell information from the second user equipment, and establishing a connection with a wireless communication network based on the radio cell information.

The method also includes receiving a paging message via a device-to-device connection with the second user equipment. The second user equipment is configured to receive the paging message via the wireless communication network. The method also includes transmitting the paging message to a third user equipment via a second device-to-device connection.

The method also includes transmitting the radio cell information to a third user equipment via a second device-to-device connection. The method also includes causing the third user equipment to establish a connection with the wireless communication network. The operational mode includes an idle mode.

In another embodiment, one or more non-transitory, tangible, computer-readable media store instructions that cause a processor to receive a request to adjust an operational mode of a first user equipment of a group of user equipment, cause the first user equipment to adjust the operational mode, receive a paging message associated with the first user equipment from a base station associated with a wireless communication network, and transmit the paging message to the first user equipment via a device-to-device connection.

The instructions also cause the processor to determine a second user equipment is disconnected from the base station, receive a second paging message associated with the second user equipment, and transmit the second paging message to the second user equipment. The instructions also cause the processor to receive a measurement report associated with the wireless communication network and transmit the measurement report to the base station and a second base station.

The instructions also cause the processor to receive a handover command from the base station, a second user equipment being connected to the base station and establish a connection with the second base station based on the handover command. The instructions also cause the processor to transmit the handover command to the first user equipment via the device-to-device connection and cause the first user equipment to disconnect from the base station based on the handover command. The instructions also cause the processor to cause the first user equipment to establish a connection with the second base station based on the handover command.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:

receiving, at a receiver of a first user equipment, a set of device identifiers associated with a group of user equipment;

receiving, at the receiver and from at least one user equipment of the group of user equipment, a request to adjust a group membership of the at least one user equipment;

adjusting, by the first user equipment, the set of device identifiers based on the request;

causing, via a transmitter of the first user equipment, transmission of the adjusted set of device identifiers to a base station of a wireless communication network; and receiving, at the receiver, a group identifier associated with the group of user equipment from the base station.

2. The method of claim 1, comprising receiving, at the receiver, a confirmation message associated with the adjusted set of device identifiers from the base station.

3. The method of claim 1, wherein the adjusted set of device identifiers comprises the set of device identifiers and one or more additional device identifiers.

4. The method of claim 1, comprising:

receiving, at the receiver, a message associated with the group identifier from the base station; and causing, via the transmitter, transmission of the message to the group of user equipment associated with the set of device identifiers based on the group identifier.

5. The method of claim 1, comprising causing, via the transmitter, transmission of a message indicative of an additional request to remain in the group of user equipment based on a set of user equipment attributes satisfying one or more criteria of a set of connection criteria.

6. The method of claim 5, wherein the one or more criteria comprises a threshold time duration associated with the group of user equipment.

7. The method of claim 1, comprising:

receiving, at the receiver, a confirmation message from the base station; and adding the at least one user equipment to the group of user equipment or removing the at least one user equipment from the group of user equipment based on the confirmation message.

8. The method of claim 7, wherein adding the at least one user equipment to the group of user equipment comprises establishing a device-to-device communication link with the at least one user equipment, and wherein removing the at least one user equipment from the group of user equipment comprises terminating the device-to-device communication link with the at least one user equipment.

9. One or more non-transitory, tangible, computer-readable media that store instructions configured to cause a processor to:

receive, at a base station associated with a wireless communication network, a set of device identifiers associated with a group of user equipment;

generate, at the base station, a group identifier based on the set of device identifiers;

cause the base station to transmit the group identifier to a first user equipment of the group of user equipment;

receive, at the base station, an updated set of device identifiers associated with an adjustment to group membership of the group of user equipment, wherein the adjustment comprises adding at least one user equipment to the group of user equipment or removing the at least one user equipment from the group of user equipment; and cause the base station to transmit a confirmation message to the first user equipment based on receiving the updated set of device identifiers, wherein the confirmation message is configured to cause the first user equipment to perform the adjustment to the group membership.

10. The one or more non-transitory, tangible, computer-readable media of claim 9, wherein the set of device identifiers comprises a primary device identifier associated with the first user equipment.

11. The one or more non-transitory, tangible, computer-readable media of claim 10, wherein the updated set of device identifiers comprises a second primary device identifier associated with a second user equipment of the group of user equipment, and wherein the instructions are configured to cause the processor to update the set of device identifiers based on the second primary device identifier.

12. The one or more non-transitory, tangible, computer-readable media of claim 11, wherein the instructions are configured to cause the processor to update the group identifier based on the second primary device identifier.

13. The one or more non-transitory, tangible, computer-readable media of claim 12, wherein the instructions are configured to cause the processor to cause the base station to transmit the updated group identifier to the second user equipment.

14. The one or more non-transitory, tangible, computer-readable media of claim 9, wherein the instructions are configured to cause the processor to:

transmit a message to the first user equipment based on the group identifier; and cause the first user equipment to transmit the message to one or more user equipment of the group of user equipment.

15. An electronic device, comprising:

a transmitter;

a receiver; and processing circuitry coupled to the transmitter and the receiver, the processing circuitry configured to:

cause the receiver to receive a set of device identifiers associated with a group of user equipment;

cause the receiver to receive a request from at least one user equipment of the group of user equipment to adjust a group membership of the at least one user equipment;

adjust the set of device identifiers based on the request;

cause the transmitter to transmit the adjusted set of device identifiers to a base station of a wireless communication network; and cause the receiver to receive a group identifier associated with the group of user equipment from the base station.

16. The electronic device of claim 15, wherein the processing circuitry is configured to cause the transmitter to transmit the group identifier to the base station.

17. The electronic device of claim 15, wherein the processing circuitry is configured to cause the receiver to receive a confirmation message associated with the adjusted set of device identifiers from the base station.

18. The electronic device of claim 16, wherein the adjusted set of device identifiers comprises the set of device identifiers and one or more additional device identifiers.

19. The electronic device of claim 15, wherein the processing circuitry is configured to cause the receiver to receive a message associated with the group identifier from the base station.

20. The electronic device of claim 19, wherein the processing circuitry is configured to cause the transmitter to transmit the message to the group of user equipment associated with the set of device identifiers based on the group identifier.

* * * * *